United States Patent
Makino et al.

(10) Patent No.: US 8,743,167 B2
(45) Date of Patent: Jun. 3, 2014

(54) OPTICAL SCANNER INCLUDING AN OPTICAL ELEMENT HOLDER AND IMAGE FORMING APPARATUS INCLUDING SAME

(75) Inventors: Hideyo Makino, Tokyo (JP); Sohichiroh Ishikawa, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

(21) Appl. No.: 13/299,764

(22) Filed: Nov. 18, 2011

(65) Prior Publication Data

US 2012/0141168 A1 Jun. 7, 2012

(30) Foreign Application Priority Data

Dec. 1, 2010 (JP) ................................. 2010-268626
Oct. 31, 2011 (JP) ................................. 2011-239263

(51) Int. Cl.
 *B41J 15/14* (2006.01)
 *B41J 27/00* (2006.01)

(52) U.S. Cl.
 USPC .......................................... 347/242; 347/257

(58) Field of Classification Search
 USPC .................... 347/230, 241–244, 256–258; 359/205.1, 206.1, 811, 813, 818, 819, 359/822
 See application file for complete search history.

(56) References Cited

U.S. PATENT DOCUMENTS

| | | | | |
|---|---|---|---|---|
| 7,443,556 B2* | 10/2008 | Serizawa | .................... | 359/205.1 |
| 7,826,116 B2* | 11/2010 | Itabashi | ..................... | 359/205.1 |
| 8,508,808 B2* | 8/2013 | Shimizu et al. | ................ | 358/474 |
| 2009/0059335 A1* | 3/2009 | Amada et al. | .................. | 359/198 |

FOREIGN PATENT DOCUMENTS

| | | | | |
|---|---|---|---|---|
| JP | 2005266762 A | | 9/2005 | |
| JP | 2007065500 A | | 3/2007 | |
| JP | 2008216548 A | | 9/2008 | |
| JP | 2008233197 A | * | 10/2008 | ................ B41J 2/44 |
| JP | 2008233203 A | | 10/2008 | |

\* cited by examiner

*Primary Examiner* — Hai C Pham
(74) *Attorney, Agent, or Firm* — Harness, Dickey & Pierce, P.L.C.

(57) ABSTRACT

An optical scanner includes a light source to project light, a light deflector to deflect light, an optical element, and a holder to hold an optical element in place. The holder includes a curve adjustment mechanism, a first pressing member, a second pressing member, and a retainer. The curve adjustment mechanism adjusts a shape of the optical element in a sub-scanning direction relative to a scanning surface and perpendicular to a main scanning direction. The first pressing member is disposed at a first side from which the first pressing member presses the optical element in the sub-scanning direction. The second pressing member is disposed at a second side opposite the first side, to press the optical element from the second side. The retainer fixes substantially a center of the optical element in a main scanning direction of the light striking the optical element to the first side.

11 Claims, 12 Drawing Sheets

OPTICAL SCANNER INCLUDING AN OPTICAL ELEMENT HOLDER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2010-268626, filed on Dec. 1, 2010, and 2011-239263, filed on Oct. 31, 2011, both in the Japan Patent Office, which are hereby incorporated herein by reference in their entirety.

TECHNICAL FIELD

Exemplary aspects of the present invention generally relate to an image forming apparatus, such as a copier, a facsimile machine, a printer, or a multi-functional system including a combination thereof, and more particularly, to an optical scanner that forms an electrostatic latent image on an image bearing member and an image forming apparatus including the optical scanner.

BACKGROUND

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member; an optical scanner projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Among known optical scanners, a long-length lens employed in the optical scanner is held by a lens support substantially at the bottom center of the long-length lens. Variation in parts and parts placement, or variation in frictional force due to a difference in a surface roughness of parts in the optical scanner causes a pressure applied to an upper surface of the lens to differ from that applied to a bottom surface thereof. As a result, the lens may not contact the surface of the lens support, which is supposed to contact the surface of the lens to hold the lens in place, but instead leaves an undesirable minute gap between the lens and the lens support.

Such a minute gap permits the lens to move undesirably when fastening an adjusting screw that presses the lens to adjust the shape of the lens. A change in the position of the lens changes the curve of the lens when the lens is subjected to shock or during adjustment, thereby changing a scan line of light passing through the lens. Generally, an optical lens requires fine adjustment by several tens of micrometers. Hence, prevention of such displacement of the lens is crucial.

A plurality of screws may be used to fix the lens in place more reliably, but at the cost of increasing the number of constituent parts and manufacturing steps.

In such an optical scanner, a spring may be used to support the lens in place. Depending on the spring and the lens, however, it may be difficult to apply stress straight in the direction of adjustment, which requires high-precision parts and assembly. Where stress is not applied properly, adjustment by the screw cannot be performed linearly and/or the lens support does not contact the lens in the pressing direction, thereby causing displacement of the lens.

Furthermore, using a plurality of springs or other elastic members further complicates assembly.

BRIEF SUMMARY

In view of the foregoing, in one illustrative embodiment of the present invention, an optical scanner includes a light source, a light deflector, an optical element, and a holder. The light source projects light. The light deflector is disposed on an optical path of the light projected from the light source to deflect and scan the light. The optical element focuses the light deflected by the light deflector onto a scanning surface. The holder holds the optical element. The holder includes a curve adjustment mechanism, a first pressing member, a second pressing member, and a retainer. The curve adjustment mechanism adjusts a shape of the optical element in a sub-scanning direction relative to the scanning surface and perpendicular to a main scanning direction. The first pressing member is disposed at a first side from which the first pressing member presses the optical element in the sub-scanning direction. The second pressing member is disposed at a second side opposite the first side, to press the optical element from the second side. The retainer fixes substantially a center of the optical element in a main scanning direction of the light striking the optical element at the first side.

In another illustrative embodiment of the present invention, an image forming apparatus includes the optical scanner.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein.

DETAILED DESCRIPTION OF DISCLOSED EMBODIMENT

Figure 1:
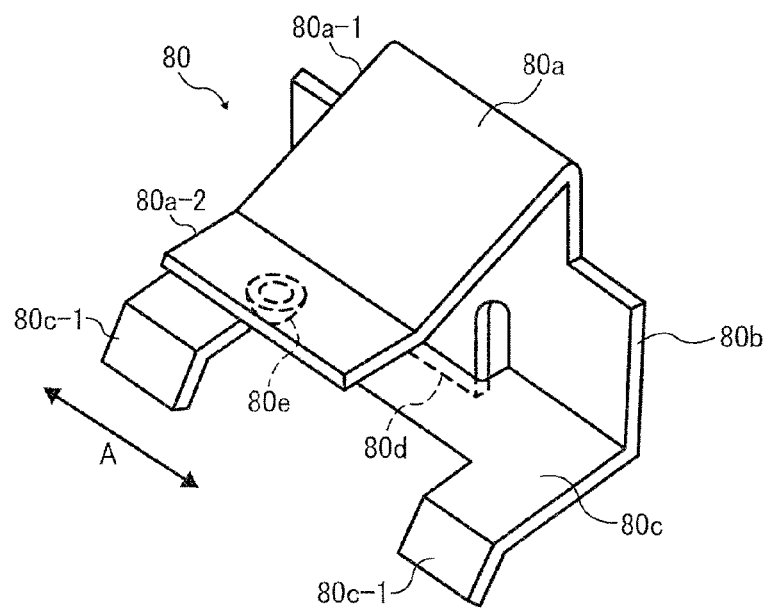
FIG. 1 is a perspective view schematically illustrating a retainer employed in an optical scanner as viewed from a direction indicated by an arrow D (shown in FIG. 2) according to an illustrative embodiment.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof paper feeder, etc., it should be understood that the sheets, etc., are not limited only to paper, but includes other printable media as well.

Figure 4:
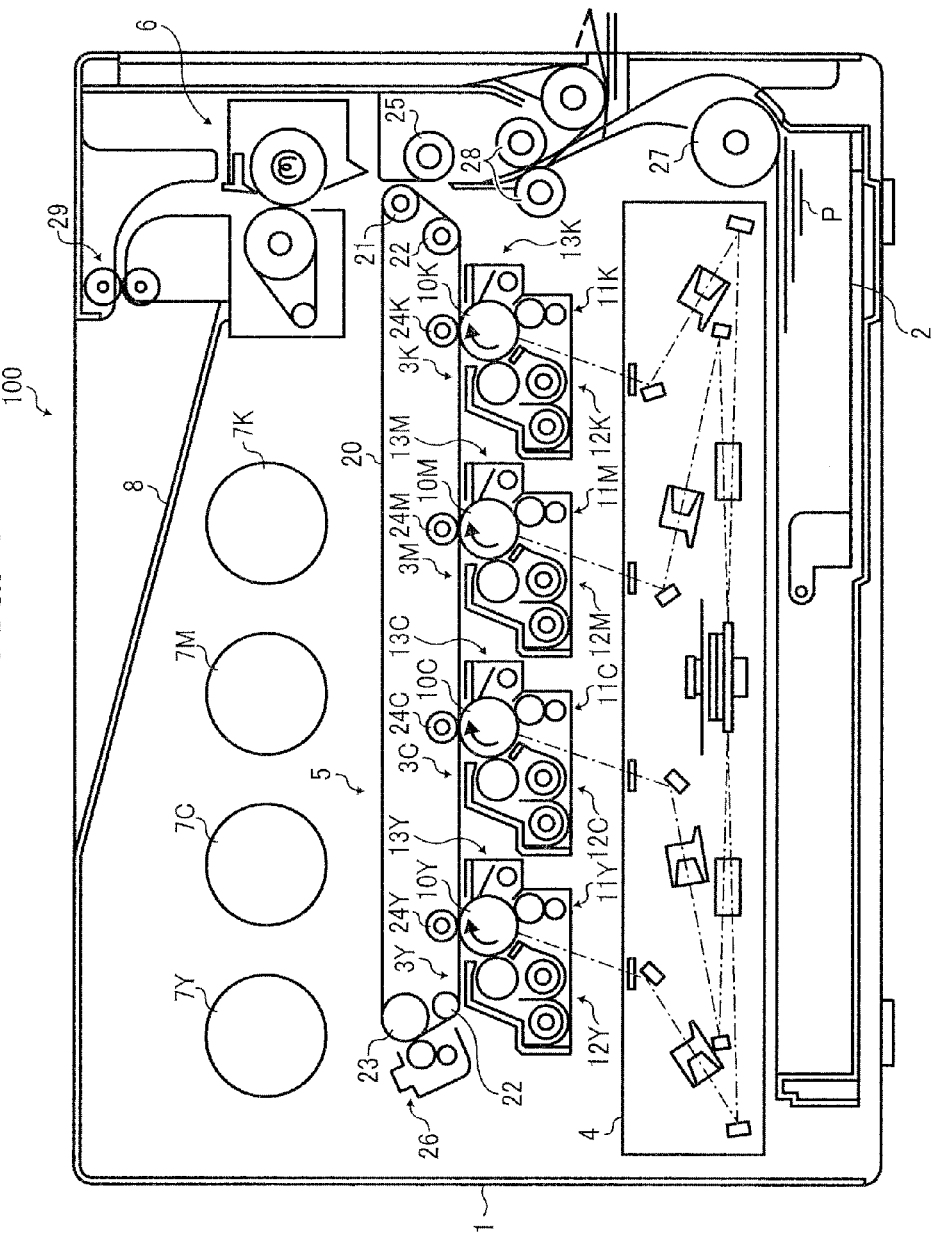
FIG. 4 is a schematic diagram illustrating an image forming apparatus according to an illustrative embodiment.

Referring now to the drawings, wherein like reference numerals designate identical or corresponding parts throughout the several views, and initially with reference to FIG. 4, a description is provided of a full-color printer as an example of an image forming apparatus according to an illustrative embodiment of the present invention. FIG. 4 is a schematic diagram illustrating the image forming apparatus.

Here, a description is provided of a tandem-type image forming apparatus 100 using an intermediate transfer method in which a toner image is transferred indirectly from an image bearing member onto a recording medium via an intermediate transfer member. However, the image forming apparatus is not limited to this configuration.

As illustrated in FIG. 4, the image forming apparatus 100 includes a main body 1 and a sheet cassette 2 which accommodates a stack of recording media sheets P and can be pulled out from the main body 1. Image forming stations 3Y, 3C, 3M, and 3K, one for each of the colors yellow, cyan, magenta, and black, are arranged in tandem substantially at the center of the main body 1. The image forming stations 3Y, 3C, 3M, and 3K form toner images, also known as visible images, of the colors yellow (Y), cyan (C), magenta (M), and black (K), respectively.

It is to be noted that the suffixes Y, C, M, and K denote the colors yellow, cyan, magenta, and black, respectively. To simplify the description, the suffixes Y, C, M, and K indicating colors are omitted herein unless otherwise specified.

Figure 5:
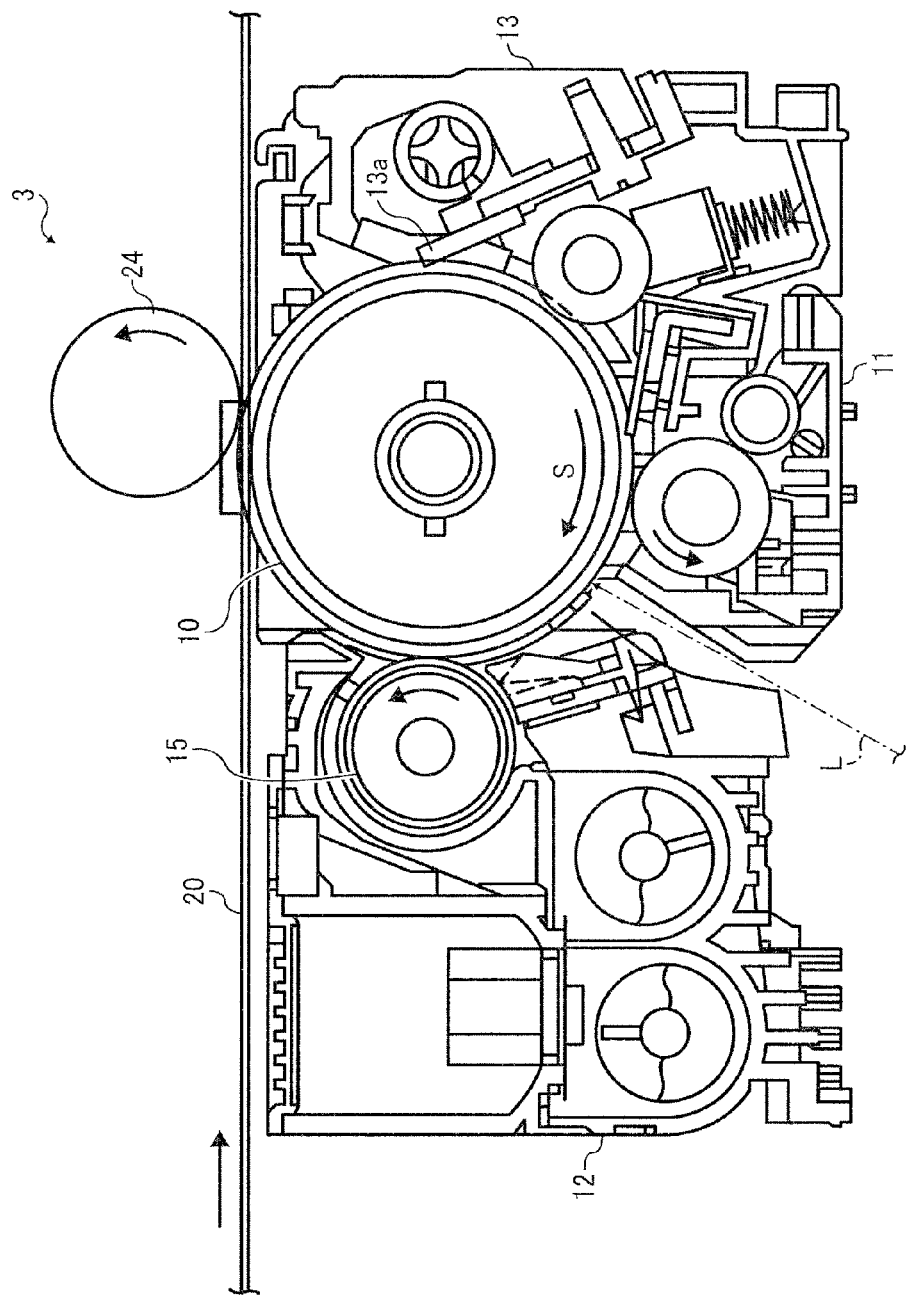
FIG. 5 is a schematic diagram illustrating an image foaming station as a representative example of the image forming stations employed in the image forming apparatus of FIG. 4.

With reference to FIG. 5, a description is provided of the image forming stations 3Y, 3C, 3M, and 3K. FIG. 5 is a schematic diagram illustrating one of the image forming stations 3Y, 3C, 3M, and 3K as a representative example of the image forming stations.

The image fainting stations 3Y, 3C, 3M, and 3K all have the same configuration as all the others, differing only in the color of toner employed. Thus, in FIG. 5, the suffixes Y, C, M, and K indicating colors are omitted herein. As illustrated in FIGS. 4 and 5, each of the image forming stations 3 includes a photoconductive drum 10 serving as a latent image bearing member. The photoconductive drum 10 rotates in a direction indicated by an arrow S.

The photoconductive drum 10 is formed of an aluminum cylinder base covered with a photosensitive layer, for example, an organic photoconductor (OPC) layer. In the image forming station 3, the photoconductive drum 10 is surrounded by various pieces of imaging equipment, such a charging device 11 and a developing device 12. The charging device 11 charges the surface of the photoconductive drum 10. The developing device 12 develops a latent image formed on the photoconductive drum 10 with toner. The cleaning device 13 cleans residual toner remaining on the photoconductive drum 10 after primary image transfer.

As illustrated in FIG. 4, an optical scanner 4 is disposed substantially below the image forming stations 3Y, 3C, 3M, and 3K. The optical scanner 4 illuminates the photoconductive drums 10Y, 10C, 10M, and 10K with writing light L. An intermediate transfer unit 5 equipped with an intermediate transfer belt 20 is disposed substantially above the image forming stations 3Y, 3C, 3M, and 3K. Toner images fondled on the photoconductive drums 10Y, 10C, 10M, and 10K are transferred onto the intermediate transfer belt 20 so that they are superimposed one atop the other, thereby forming a composite toner image. Subsequently, the composite toner image is transferred onto a recording medium P such as a sheet of paper.

The image forming apparatus 100 also includes a fixing device 6 that permanently fixes the toner image transferred onto the recording medium P from the intermediate transfer belt 20.

Toner bottles 7Y, 7C, 7M, and 7K, one for each of the colors yellow, cyan, magenta, and black are disposed substantially at an upper portion of the main body 1. The toner bottles 7Y, 7C, 7M, and 7K store toner of a respective color. The toner bottles 7Y, 7C, 7M, and 7K are detachably installed in the main body 1. The toner bottles 7Y, 7C, 7M, and 7K can be detached from the main body 1 by opening a sheet discharge tray 8 provided at the upper portion of the main body 1.

The optical scanner 4 includes a light source such as a laser diode to project writing light L (light beam) against the photoconductive drums 10Y, 10C, 10M, and 10K. The writing light L projected from the light source is deflected by a polygon mirror or the like to scan the surface of the photoconductive drums 10Y, 10C, 10M, and 10K. A detailed description of the optical scanner 4 is provided later with reference to FIG. 6.

The intermediate transfer belt 20 of the intermediate transfer unit 5 serving as a transfer mechanism is formed into a loop and wound around a plurality of rollers: a drive roller 21, a tension roller 22, and a driven roller 23. The intermediate transfer belt 20 rotates in a counterclockwise direction in FIG. 1 at a predetermined speed.

The intermediate transfer unit 5 includes primary transfer rollers 24Y, 24C, 24M, and 24K inside the loop formed by the intermediate transfer belt 20, each facing the photoconductive drums 10 via the intermediate transfer belt 20, thereby forming a primary transfer nip therebetween. The intermediate transfer unit 5 also includes a secondary transfer roller 25 and a belt cleaning device 26. The secondary transfer roller 25 transfers the composite toner image having been transferred on the intermediate transfer belt 20 to the recording medium P. The belt cleaning device 26 cleans the residual toner remaining on the intermediate transfer belt 20 after secondary transfer.

Next, with reference to FIG. 5, a description is provided of a color imaging process of the image forming apparatus 100, according to an illustrative embodiment of the present invention.

In each of the image forming stations 3, the photoconductive drum 10 is uniformly charged by the charging device 11. Subsequently, based on image information, the photoconductive drums 10 are scanned and exposed by the light L (light beam), thereby forming a latent image of a respective color on each of the photoconductive drums 10. The latent image on the photoconductive drum 10 is developed with toner of respective color borne on a developing roller 15 of the developing device 12, thereby forming a visible image, also known as a toner image of respective color. The developing roller 15 rotates in a direction indicated by an arrow T in FIG. 5.

The primary transfer rollers 24 transfer primarily the toner images formed on the photoconductive drums 10 onto the intermediate transfer belt 20 rotating in the counterclockwise direction so that they are superimposed one atop the other, thereby forming a composite color toner image. More specifically, the toner images are transferred from the photoconductive drums 10 onto the intermediate transfer belt 20 at different timing from the upstream end to the downstream end in the direction of movement of the intermediate transfer belt 20 such that the toner images are transferred at the same position on the intermediate transfer belt 20.

The cleaning device 13 is equipped with a cleaning blade 13a (shown in FIG. 5). After primary transfer, the cleaning blade 13a cleans the surface of the photoconductive drum 10 in preparation for the subsequent imaging cycle. The toner in the toner bottles 7 is supplied to the developing devices 12 of the image forming stations 3 as necessary.

A sheet feed roller 27 disposed substantially near the sheet cassette 2 picks up a top sheet from the stack of recording media sheets in the sheet cassette 2 and sends it to a pair of registration rollers 28 in the main body 1. The recording medium P is temporarily stopped by the pair of registration rollers 28 and is sent to a secondary transfer portion at which the secondary transfer roller 25 faces a tension roller 22 via the intermediate transfer belt 20, in appropriate timing such that the recording medium P is aligned with the composite toner image formed on the intermediate transfer belt 20. At the secondary transfer portion, the composite toner image formed on the intermediate transfer belt 20 is transferred onto the recording medium P.

The recording medium P bearing the composite toner image passes through the fixing device 6 so that the composite toner image is permanently fixed on the recording medium P. Subsequently, the recording medium P is discharged onto the sheet discharge tray 8 by a pair of sheet discharge rollers 29. Similar to the photoconductive drum 10, the residual toner remaining on the intermediate transfer belt 20 is cleaned by the belt cleaning device 26 contacting the intermediate transfer belt 20.

Figure 6:
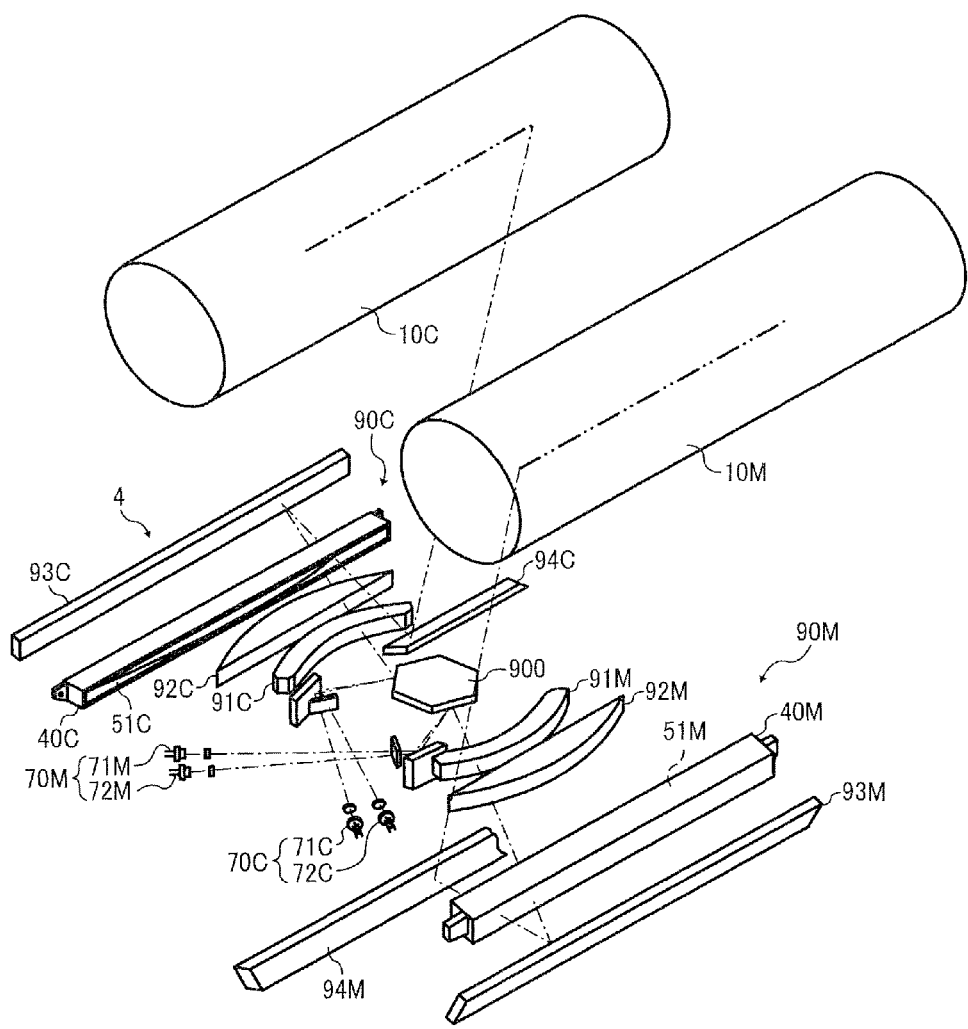
FIG. 6 is a perspective view schematically illustrating the optical scanner.

With reference to FIG. 6, a description is provided of the optical scanner 4. FIG. 6 is a perspective view schematically illustrating the optical scanner 4 according to an illustrative embodiment of the present invention.

Although FIG. 6 illustrates the optical scanner 4 under which the photoconductive drum 10 is disposed, the photoconductive drum 10 can be disposed above the optical scanner 4 so as to be implemented in the image forming apparatus 100 as shown in FIGS. 4 and 5.

FIG. 6 illustrates an LD unit 70M, an LD unit 70C, an optical element assembly 90M, and an optical element assembly 90C. The LD unit 70M serves as a light source and projects light (light beam). The optical element assembly 90M focuses the light projected from the LD unit 70M on the photoconductive drum 10M to form a toner image of the color magenta. Similarly, the LD unit 70C serves as a light source and projects light (light beam). The optical element assembly 90C focuses the light L projected from the LD unit 70C on the photoconductive drum 10C to form a toner image of the color cyan.

A polygon mirror 900 serving as a light deflector is shared by an optical path from the LD unit 70M to the photoconductive drum 10M, and an optical path from the LD unit 70C to the photoconductive drum 10C. The polygon mirror 900 may be used as a light deflector for optical paths for the colors yellow and black. Alternatively, another polygon mirror may be provided additionally to deflect the light from the light sources for yellow and black.

In FIG. 6, the configuration along the optical path for the light projected from the LD unit 70M to the photoconductive drum 10M to form the toner image for magenta on the photoconductive drum 10M is the same as the configuration along the optical path for the light projected from the LD unit 70C to the photoconductive drum 10C, differing only in the color of toner. Therefore, the suffixes M and C indicating the colors magenta and cyan are omitted in FIG. 6. In the optical scanner 4, the LD unit 70 includes a first light source 71 and a second light source 72. The light projected from the first light source 71 and the second light source 72 of the LD unit 70 is focused onto the surface of the photoconductive drum 10.

The optical element assembly 90 includes various optical elements such as the polygon mirror 80 serving as a light deflector, a first scanning lens 91, a second scanning lens 92, a long-length lens 51 (hereinafter referred to as a lens 51) serving as a third scanning lens, a first reflection mirror 93, a second reflection mirror 94, and a third reflection mirror 95. The optical element assembly 90 is disposed on the optical path between the LD unit 70 and the photoconductive drum 10.

The first light source 71 and the second light source 72 of the LD unit 70 may employ a semiconductor laser element that projects a single light beam, or a semiconductor laser array element that projects a plurality of light beams. It is to be noted that the first scanning lens 91, the second scanning lens 92, and the lens 51 are long in a scanning direction of the light L scanned by the polygon mirror 900 to strike the lenses.

As described above with reference to FIG. 6, an optical system of the optical scanner 4 consists of the plurality of the optical elements. It is difficult to manufacture these optical elements without a manufacturing error and to assemble these optical elements accurately in a housing of the optical scanner 4. Accumulation of such a manufacturing error and an assembly error changes the shape of a linear scan line of the light beam L that scans the surface of the photoconductive drum 10 into a curved line. Furthermore, accumulation of such errors causes the scan line parallel to the rotation axis of the photoconductive drum 10 to tilt.

Figure 7:
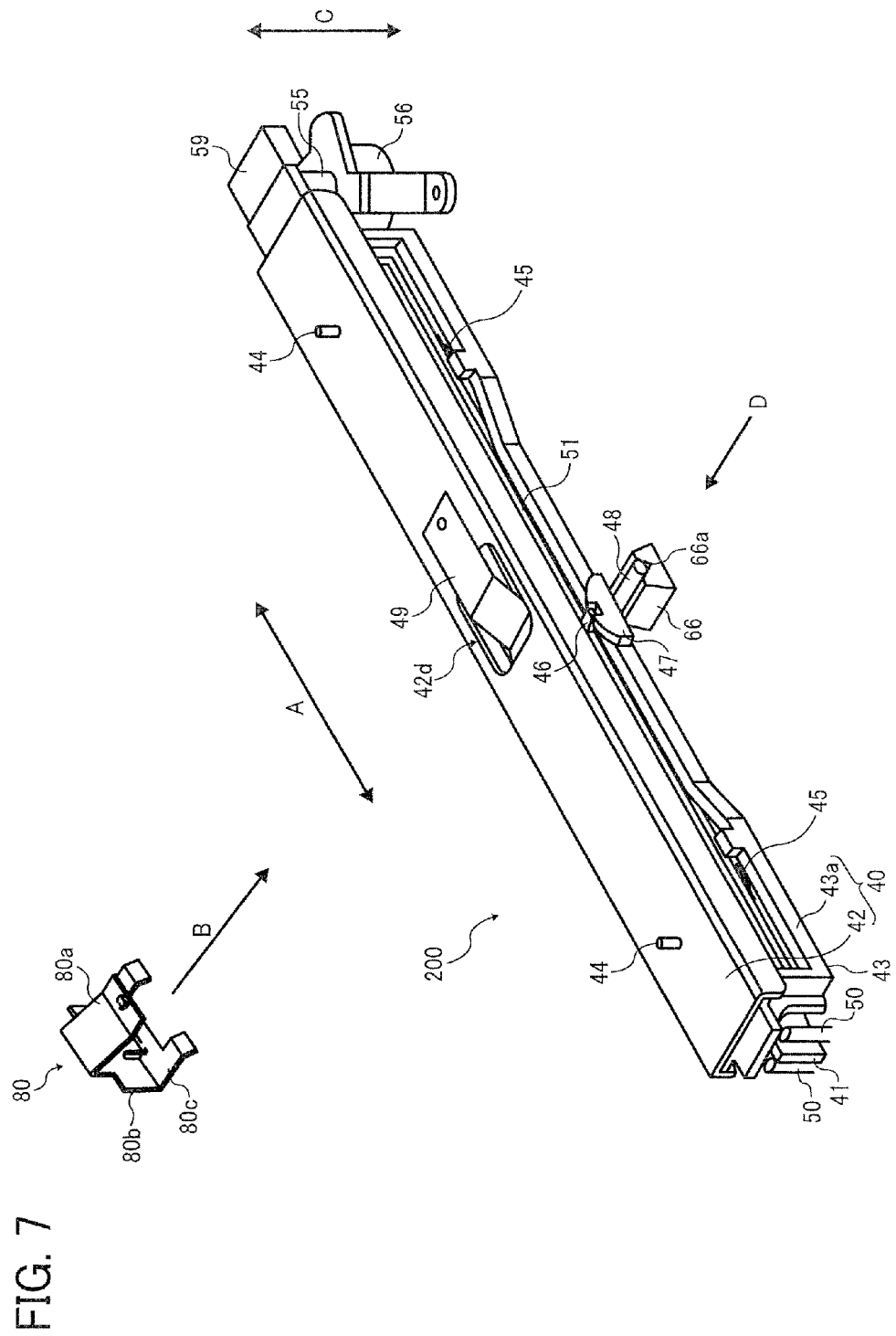
FIG. 7 is a perspective view schematically illustrating a lens unit employed in the optical scanner of FIG. 6.
Figure 8:
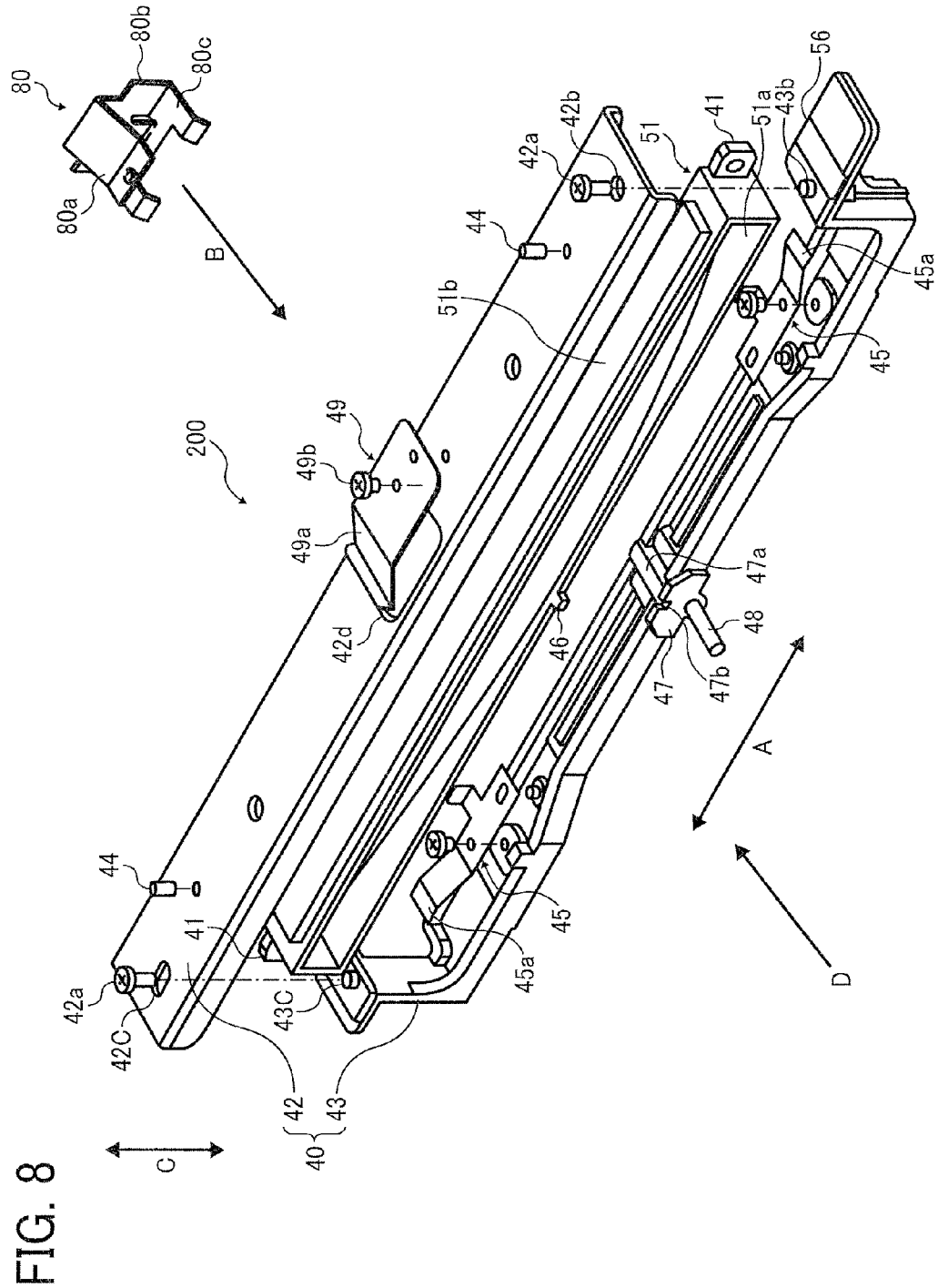
FIG. 8 is an exploded perspective view schematically illustrating the lens unit of FIG. 7.

In view of the above, in the optical scanner 4 according to an illustrative embodiment shown in FIGS. 7 and 8, the curved scan line and tilt of the scan line can be corrected by adjusting the lens 51 serving as a third scanning lens.

FIG. 7 is a perspective view schematically illustrating a lens unit 200 employed in the optical scanner 4. FIG. 8 is an exploded perspective view of the lens unit 200 of FIG. 7.

The direction indicated by a double-headed arrow A in FIG. 7 is a direction of the light beam L scanned by the polygon mirror 900 to strike the lens of the lens 51. Thereafter, this direction is referred to as a "scanning direction". The direction substantially parallel to an optical axis of the light beam L passing through the lens 51 is referred to as an "optical axis direction". The direction indicated by a single-headed arrow B in FIG. 7 is a direction that coincides with the optical axis of the light beam L and a mounting direction of a retainer 80. The direction indicated by a double-headed arrow C in FIG. 7 is a direction perpendicular to the scanning direction and the optical axis direction. The direction C also corresponds to a sub-scanning direction on the photoconductive drum 10.

As illustrated in FIG. 6, the installation of the lens 51M for magenta is symmetrical to the installation of the lens 51C for cyan. However, the configuration of the lens 51M is the same as the lens 51C. Therefore, a description thereof is provided without the suffixes M and C, unless otherwise specified.

As illustrated in FIGS. 7 and 8, the lens 51 is held by a lens holder 40. More specifically, the lens holder 40 includes a holder main frame 43 and a top plate 42. The long side of the holder main frame 43 corresponds to the main scanning direction. The lens 51 is placed on and supported by the holder main frame 43 from the bottom. The top plate 42 is placed on the lens 51 on the holder main frame 43. The side at which the top plate 42 is placed is referred to as a pressing side (second side). The lens 51 is interposed between the top plate 42 and the holder main frame 43.

Substantially the center of the lens 51 in the scanning direction thereof (direction of arrow A) has a protrusion 46 to be used for alignment of the lens 51 relative to the lens holder 40 in the scanning direction. A protruding piece 41 is provided at each end of the lens 51 in the scanning direction thereof. The protruding piece 41 is used for alignment of the lens 51 relative to the lens holder 40 in the optical axis direction.

A bottom portion 43a of the holder main frame 43 in the direction of arrow C serves as a support side (first side). A regulating member 47 is provided substantially at the center of the bottom portion 43a of the holder main frame 43. The regulating member 47 includes a groove 47b that engages the protrusion 46 of the lens 51. The position of the lens 51 relative to the lens holder 40 in the scanning direction is aligned by engaging the protrusion 46 and the groove 47b of the regulating member 47. Thus, reference surfaces of the protrusion 46 and the groove 47b are finely processed.

With such a configuration, the center of the holder main frame 43 of the lens holder 40 and the center of the lens 51 in the scanning direction are positioned in place. In other words, the protrusion 46 of the lens 51 and the groove 47b of the regulating member 47 constitute a center position alignment mechanism.

An upper surface 47a of the regulating member 47 contacts the bottom surface of the lens 51 to support the center of the lens 51. The upper surface 47a is a reference plane that serves as a reference position in the direction of arrow C for the lens 51 in the lens holder 40. The upper surface 47a of the regulating member 47 is positioned slightly higher than the bottom surface of the groove 47b.

An elastic member, that is, a first spring 45 serving as a first pressing member is provided substantially at each side of the regulating member 47 of the holder main frame 43 in the scanning direction. According to an illustrative embodiment shown in FIG. 8, the first spring 45 is a leaf spring that biases the bottom surface of the lens 51 upward. However, the first spring 45 is not limited to a leaf spring. Any other suitable elastic member may be employed. The first spring 45 includes a pressing portion 45a that contacts the bottom surface of the lens 51 to press the lens upward.

A second spring 49 serving as a second pressing member is fixed to the top plate 42 at a position opposite the regulating member 47 of the holder main frame 43 via the lens 51. According to an illustrative embodiment shown in FIG. 8, the second spring 49 is a leaf spring that biases the upper surface of the lens 51 downward. However, the second spring 49 is not limited to a leaf spring. Any other suitable elastic member may be employed. The second spring 49 includes a pressing portion 49a that contacts the upper surface of the lens 51 to press the lens 51 downward.

An adjusting screw 44 serving as a lens curve adjuster is provided substantially at each side of the second spring 49 in the scanning direction, facing the pressing portion 45a of the first spring 45. A detailed description of the adjusting screw 44 is provided later with reference to FIG. 9.

If the lens 51 is made of resin and the adjusting screw 44 is made of metal, the leading end portion of the adjusting screw 44 digs into the upper surface of the lens 51, damaging the lens 51 when the adjusting screw 44 presses the lens 51 directly. In view of the above, according to an illustrative embodiment as illustrated in FIG. 8, the lens 51 includes a glass plate 51b disposed on top of a lens main body 51a made of resin. The glass plate 51b is harder than the lens main body 51a and serves as a slide member. The upper surface of the glass plate 51b is pressed by the leading edge of the adjusting screw 44. Accordingly, the leading edge of the adjusting screw 44 is prevented from sinking into the lens undesirably.

Figure 9:
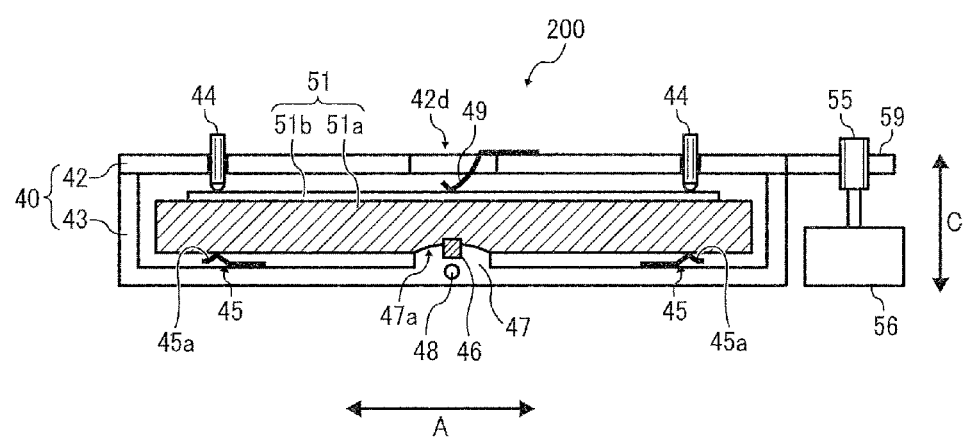
FIG. 9 is a schematic diagram illustrating the lens unit as viewed from the direction of arrow D.
Figure 10:
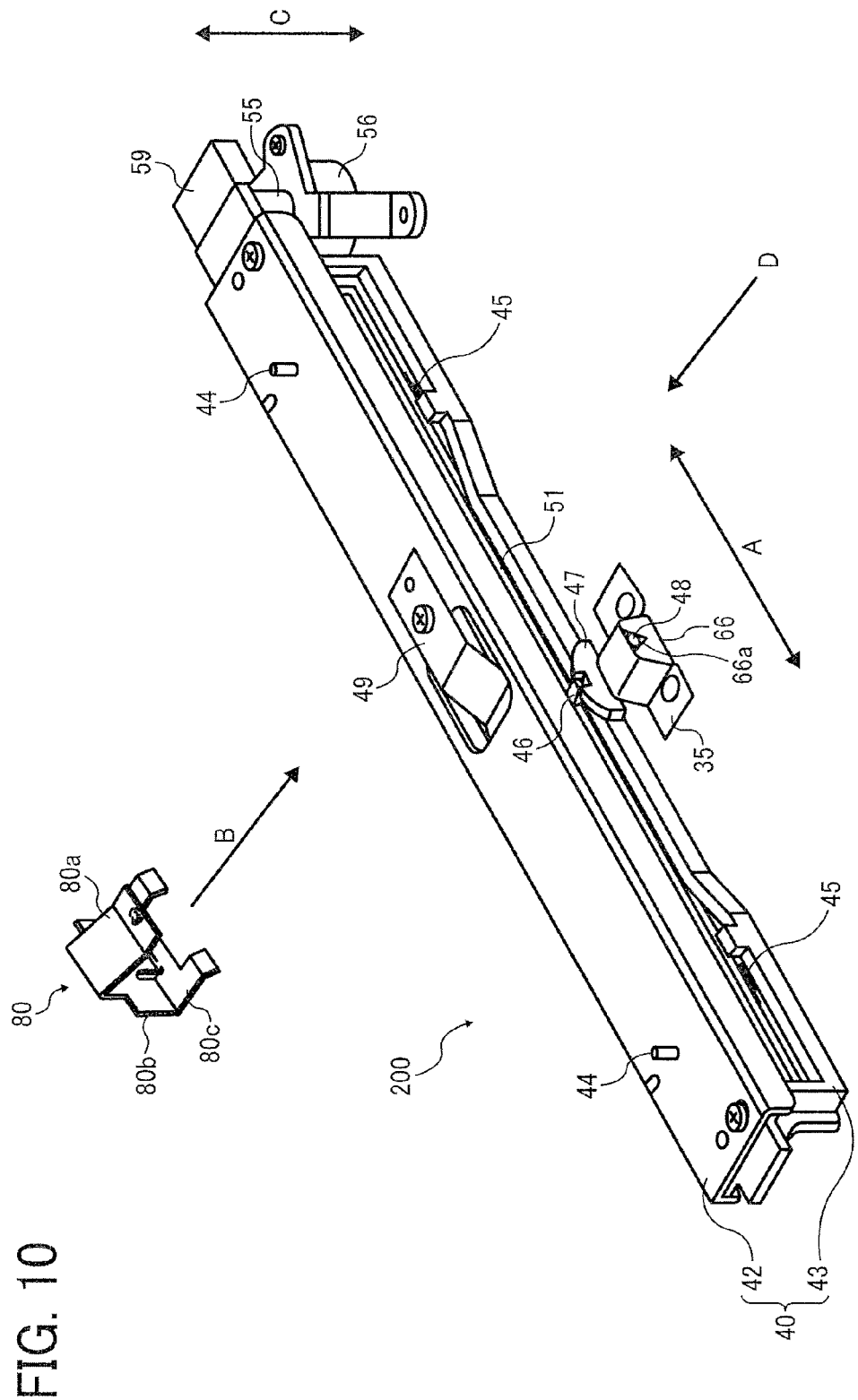
FIG. 10 is a perspective view schematically illustrating the lens unit including a shaft support spring.

With reference to FIG. 9, a further description is provided of the lens unit 200. FIG. 9 is a schematic diagram illustrating the lens unit 200 of FIG. 7, as viewed from a direction indicated by an arrow D. As illustrated in FIG. 9, the lens 51 is held by the lens holder 40 using the second spring 49, the adjusting screws 44, the upper surface 47a, and the elastic members 45. The upper surface 47a of the regulating member 47 of the lens holder 40 contacts substantially the center of the lens from the bottom thereof in the sub-scanning direction.

The second spring 49 is disposed opposite the upper surface 47a via the lens 51 to press the lens 51 downward, that is, against the upper surface 47a. The second spring 49 serves as a center pressing member. The second spring 49 is fixed to the top plate 42. The regulating member 47 is provided to the holder main frame 43. In other words, the second spring 49 and the regulating member 47 are fixed to the lens holder 40.

Substantially the center of the lens 51 is pressed down by the second spring 49 and contacts the upper surface 47a of the regulating member 47. Accordingly, the lens 51 is positioned in place relative to the lens holder 40 in the sub-scanning direction. In this configuration, the second spring 49 and the upper surface 47a constitute an optical element center supporter.

As described above, the second spring 49 and the upper surface 47a of the regulating member 47 can fix the position of the center of the lens 51 relative to the lens holder 40 in the sub-scanning direction. With this configuration, the position of the light projected from the LD unit 70 against the center of the lens 51 in the sub-scanning direction is prevented from shifting.

The lens 51 includes a curve adjusting portion at each side of the lens 51 relative to the center of the lens 51 in the scanning direction. A biasing force in the sub-scanning direction is applied to the curve adjusting portions by the adjusting screws 44 and the elastic members 45. The curve adjusting portion of the lens 51 is a place interposed between the adjusting screw 44 and the first spring 45. The tip of adjusting screw 44 serving as a pressing member provided to the top plate 42 presses the curve adjusting portion of the lens 51 from the top in the sub-scanning direction.

The first spring 45 disposed opposite the adjusting screw 44 via the lens 51 presses the lens 51 upward against the adjusting screw 44. Rotation of the adjusting screw 44 at each end of the top plate 42 changes the position of the leading end of the adjusting screw 44 in the sub-scanning direction. As the adjusting screw 44 is rotated to move the leading end thereof down, pressing the curve adjusting portion down, the first spring 45 is compressed, that is, the pressing portion 45a moves down, thereby moving the curve adjusting portion down.

By contrast, as the adjusting screw 44 is rotated to move the leading end thereof upward, the first spring 45 pushes the curve adjusting portion up, that is, the pressing portion 45a moves up, thereby moving the curve adjusting portion up.

As illustrated in FIG. 9, substantially the center of the lens 51 is fixed; whereas, each end of the lens 51 outside the curve adjusting portion in the scanning direction can move flexibly. In this configuration, where the curve adjusting portion is positioned substantially below the center of the lens 51, the end portion of the lens 51, that is, the end portion of the optical element, in the scanning direction is positioned substantially below the center of the lens 51.

Similarly, where the curve adjusting portion is positioned substantially above the center of the lens 51, the end portion of the lens 51 in the scanning direction is positioned substantially above the center of the lens 51. When moving the leading end of the adjusting screws 44 down, the curve adjusting portion of the lens 51 at each end moves down, that is, each end of the lens 51 bends downward. As a result, the lens 51 in a linear shape shown in FIG. 9 curves upward, that is, the lens 51 becomes upward convex.

By contrast, when moving the leading end of the adjusting screws 44 upward, the curve adjusting portion of the lens 51 at each end moves upward, that is, the each end of the lens 51 bends upward. As a result, the linear lens 51 shown in FIG. 9 curves downward, that is, the lens 51 becomes downwardly convex.

According to the illustrative embodiment as described above, the second spring 49 serving as a fixation member, the upper surface 47a of the regulating member 47a, and two sets of the adjusting screw 44 and the first spring 45 constitute a curve adjuster. Two sets of the adjusting screw 44 and the first spring 45 serve as a displacement amount adjuster.

The adjusting screw 44 and the first spring 45 may be disposed closer to the center of the lens 51 than the position shown in FIG. 9. Alternatively, the adjusting screw 44 and the first spring 45 may be disposed at each end portion of the lens 51.

Two sets of the adjusting screws 44 and the first spring 45 can adjust the position of the end portions of the lens 51 relative to the center of the lens 51 in the sub-scanning direction including up and down directions. With this configuration, the direction of the curve of the lens 51 can be changed in both up and down directions. More specifically, the lens 51 can be convex upward and downward.

As described above with reference to FIG. 9, the lens 51 can be curved upward and downward in the sub-scanning direction. Furthermore, the position of the light beam L projected from the LD unit 70 is aligned with respect to the center of the lens 51 in the sub-scanning direction.

Next, a description is provided of correction of a curved scan line. Here, the upper side of the lens 51M in the sub-scanning direction faces the downstream side of the photoconductive drum 10M in the surface moving direction thereof. The light beam corresponding to the color magenta passes through the lens 51M.

In a state in which the lens 51 is linear and the scan line scanned on the photoconductive drum 10M is curved, that is, the scan line forms a convex shape in the surface moving direction, the adjusting screws 44 are loosened to curve the lens 51M downward (downward convex). By adjusting the adjusting screws 44, the scan line of the photoconductive drum 10 is brought to a linear shape or near linear shape, thereby correcting the curved scan line.

As for the color cyan, similar to the lens 51C, the upper side of the lens 51C in the sub-scanning direction faces the downstream side of the photoconductive drum 10C in the surface moving direction thereof. The light beam corresponding to the color cyan passes through the lens 51C. The mounting direction of the lens 51M for magenta is opposite the mounting direction of the lens 51C.

In a state in which the lens 51C is linear and the scan line scanned on the photoconductive drum 10C forms a convex shape in the surface moving direction, the adjusting screws 44 are fastened so as to curve the lens 51C upward (upward convex). By moving the adjusting screws 44, the scan line of the photoconductive drum 10C is brought to a linear shape or near linear shape, thereby correcting the curved scan line.

In the lens unit 200, a fastening amount of the adjusting screws 44 against the lens 51 can be adjusted separately. In other words, either one of the adjusting screws 44 is moved so as to move one end portion of the lens 51 up and down. More specifically, only the right end portion or the left end portion of the lens 51 can be moved.

The curve of the scan line on the photoconductive drum 10 is not limited to up or down in the surface moving direction of the photoconductive drum 10. There may be a case in which one end of the scan line tilts in the surface moving direction. In such a case, the end portion of the lens 51 corresponding to the inclined side of the scan line is moved up or down, thereby correcting the curved scan line.

In the tandem-type image forming apparatus similar to the one as illustrated in FIG. 4, in which four photoconductive drums are arranged in tandem in the conveyance direction of the recording medium P and toner images formed on the photoconductive drums are transferred onto the recording medium P such that they are superimposed one atop the other, misalignment of the toner images occurs if the optical elements designated for each color have manufacturing or installation errors and hence the shape of the scan lines differs.

In view of the above, the lens unit 200 of the image forming apparatus 100 of the illustrative embodiment allows a separate adjustment of the shape (curve) of the scan lines for each color even when the shape of the scan lines differs from one another. In this configuration, the direction of curve of the scan lines is aligned for each color, thereby minimizing the positional deviation of each color.

Figure 11A:
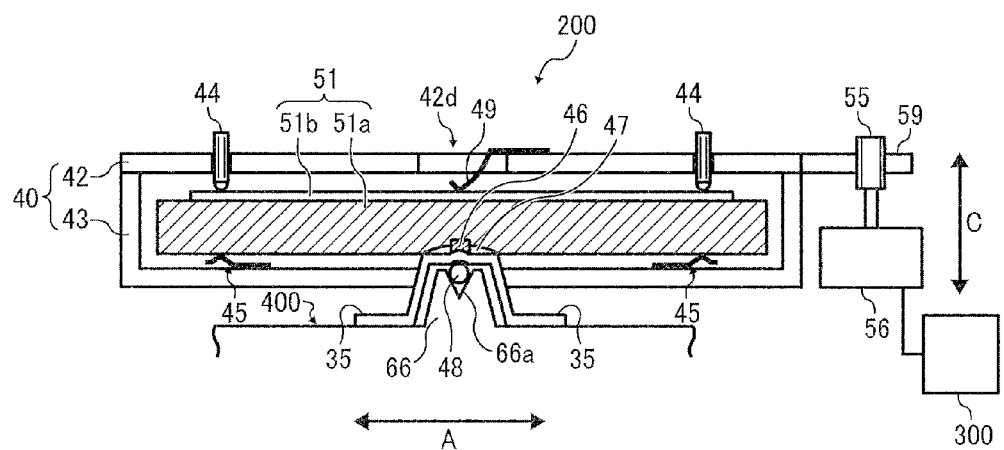
FIG. 11A is a front view schematically illustrating the lens unit as viewed from the direction of arrow D.
Figure 11B:
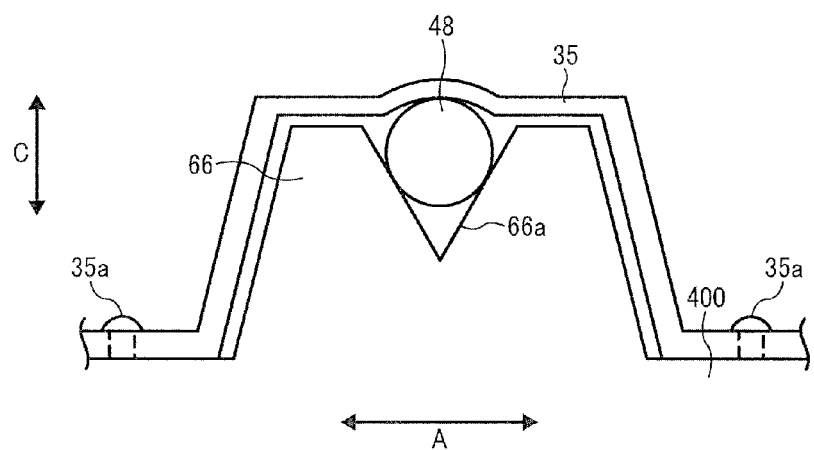
FIG. 11B is a partially enlarged schematic diagram illustrating a portion of the lens unit near a rotary shaft.

With reference to FIGS. 11A and 11B, a description is provided of an adjustment of inclination of the scan line. FIG. 11A is a front view schematically illustrating the lens unit 200 mounted on a housing 400 of the optical scanner 4. FIG. 11B is an enlarged schematic diagram illustrating a portion of the lens unit 200 near a rotary shaft 48 about which the lens unit 200 rotates.

As illustrated in FIG. 11A, the rotary shaft 48 is fixed to the holder main frame 43 of the lens holder 40. The lens holder 40 rotates about the rotary shaft 48 to adjust the orientation of the lens holder 40 relative to the housing 400 of the optical scanner 4. The housing 400 includes a support table 66 that supports the rotary shaft 48. The housing 400 and the support table 66 constitute a single integrated unit. The support table 66 includes a V-shaped groove 66a in which the rotary shaft 48 is fitted, thereby positioning the housing 400 in place in the scanning direction.

As illustrated in FIG. 11B, while the rotary shaft 48 is fitted in the groove 66a, a shaft support spring 35 which is an elastic member is fixed to the housing 400 by a fixing screw 35a. Accordingly, the shaft support spring 35 biases the rotary shaft 48 fixed to the lens holder 40 against the support table 66. That is, the shaft support spring 35 biases the rotary shaft 48 downward. With this configuration, substantially a lower side of the rotary shaft 48 is positioned in place in the groove 66a while substantially an upper portion of the rotary shaft 48 is positioned in place by the shaft support spring 35. Hence, the lens holder 40 is reliably supported by the support table 66.

As illustrated in FIG. 11A, the optical scanner 4 includes a drive motor 56 serving as a driving mechanism to rotate the lens holder 40 about the rotary shaft 48 relative to the housing 400. The drive motor 56 is a stepping motor. One end of the lens unit 200 is provided with a transmitting piece 59 which receives power from the drive motor 56. More specifically, the power from the drive motor 56 is transmitted to the transmitting piece 59 via a drive gear 55.

Driving the drive motor 56 enables the lens unit 200 to rotate about the rotary shaft 48, thereby changing the orientation of the lens unit 200 relative to the optical scanner 4. A controller 300 serving as a controlling mechanism controls the drive motor 56 so as to adjust and correct inclination of the scan line on the photoconductive drum 10. As described above, the support table 66, the shaft support spring 35, and the controller 300 constitute a scan line correction mechanism in the optical scanner 4.

As illustrated in FIGS. 11A and 11B, an elastic force of the shaft support spring 35 acts on the rotary shaft 48 about which the lens holder 40 rotates. Even when an elastic member having a relatively large elastic force is employed as the shaft support spring 35, moment around the rotary shaft 48 due to the elastic force does not increase significantly. Thus, when adjusting the orientation of the lens holder 40 relative to the housing 400, the effect of the shaft support spring 35 can be reduced.

Where an elastic member having a large elastic force is used as the shaft support spring 35, a drive torque load hardly increases when adjusting the orientation by the drive motor 56. The orientation of the lens holder 40 can be adjusted with accuracy relative to the housing 400. Accordingly, the lens holder 40 is supported reliably with respect to the housing 400 of the optical scanner 4, and correction of inclination of the scan line can be enhanced.

Next, a description is provided of correction of inclination of the scan line in the lens unit 200. Inclination of the scan line on the photoconductive drum 10 is adjusted by adjusting the orientation of the lens 51 relative to the housing 400. More specifically, the lens unit 200 is rotated about the rotary shaft 48 which is parallel to the optical axis direction of the lens 51.

The regulating member 47 formed on the holder main frame 43 of the lens holder 40 is provided with the rotary shaft 48 about which the lens unit 200 rotates. Referring back to FIG. 7, the protruding piece 41 is provided to each end of the lens 51 and inserted between two positioning pins 50 fixed to the housing 400. Accordingly, the lens 51 is positioned in place relative to the housing 400 of the optical scanner 4 in the optical axis direction.

The housing 400 and the lens holder 40 are positioned in place in the scanning direction by fitting the rotary shaft 48 in the groove 66a. The lens 51 and the lens holder 40 are positioned in place in the scanning direction by the protrusion 46 engaging the groove 47b. As a result, the housing 400 and the lens 51 are reliably positioned in place in the scanning direction. With the configuration described above, the optical axis of the light beam L can pass through the center of the lens 51 in the scanning direction.

The drive motor 56 is driven based on an amount of displacement of the scan line detected by an inclination detector that detects inclination of the scan line using a toner patch formed on the photoconductive drum 10 or on the intermediate transfer belt 20. Correction of the scan line is performed.

Variations in parts and parts placement, or variations in a frictional force due to a difference in a surface roughness of parts in the optical scanner cause a fluctuation in a pressure applied to the upper and the bottom surfaces of the lens. As a result, the center of a long lens 51 does not contact the upper surface 47a of the lens regulator 47, foaming a minute gap therebetween. Furthermore, upon changing the pressing amount of the adjusting screw 44 to adjust the curve of the scan line, the stress causes the lens to move slightly.

The second spring 49 presses the upper surface of the lens main body 51a. If a significant amount of pressure is applied thereto, the lens main body 51a deforms from the point of loading, causing the position of the light beam L to shift and/or degrading characteristics of the light beam L. For this reason, the pressure to be applied is limited, and hence the center of the lens 51 may not contact the upper surface 47a of the regulating member 47.

In view of the above, the optical scanner 4 includes a structure that prevents such a gap. FIG. 1 is a perspective view schematically illustrating a retainer 80 which is C-shaped in cross section in the sub-scanning direction. Material of the retainer 80 includes a spring metal plate such as a stainless steel plate, a phosphor bronze plate, and a beryllium copper plate.

The retainer 80 is formed of the spring plate that includes an upper pressing member 80a including a bent plane, a vertical member 80b, a flat, lower pressing member 80c serving as a support point, and a projection 80d serving as a stopper. The upper pressing member 80a, the vertical member 80b, the lower pressing member 80c, and the projection 80d constitute a single integrated unit made by the spring plate.

The upper pressing member 80a includes a base piece 80a-1 and a pressing piece 80a-2. The base piece 80a-1 extends obliquely downward from the upper end of the vertical member 80b. The pressing piece 80a-2 extends substantially horizontally from the base piece 80a-1. Substantially the center of the pressing piece 80a-2 in the scanning direction (direction A) is provided with a projection 80e having a spherical contact surface. The projection 80e is formed by stamping process.

The leading edge of the lower pressing member 80c in the mounting direction is cut out in a shape of "U" to achieve a reliable support or fitting conditions in the scanning direction. Front end portions 80c-1 of the lower pressing member 80c are bent downward so as to facilitate installation of the retainer 80 in the lens holder 40. The projection 80d is formed by cutting and bending the spring plate.

Figure 2:
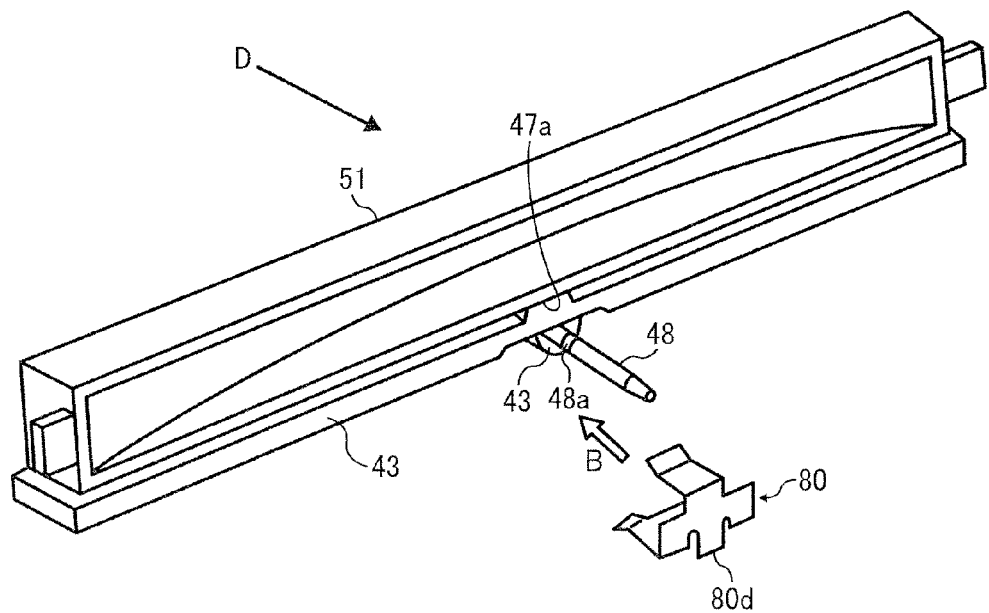
FIG. 2 is a perspective view schematically illustrating a lens, a lens holder and the retainer of FIG. 1 as viewed from a mounting direction indicated by an arrow B.
Figure 3:
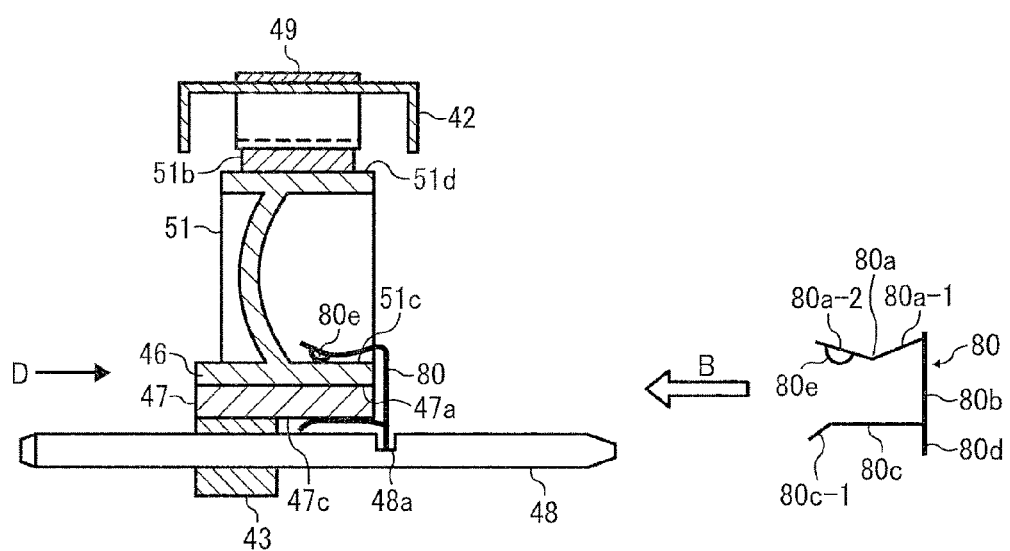
FIG. 3 is a cross-sectional view schematically illustrating substantially the center of the lens supported by the retainer.

With reference to FIGS. 2 and 3, a description is provided of installation of the retainer 80 in the lens 51 disposed on the holder main frame 43. FIG. 2 is a perspective view schematically illustrating installation of the retainer 80 in the lens 51 from the optical axis direction. FIG. 3 is a cross-sectional view schematically illustrating substantially the center of the lens 51 with the retainer in the scanning direction.

As illustrated in FIG. 3, the center of the lens 51 is supported by the upper surface 47a serving as a contact member of the regulating member 47. The retainer 80 is inserted to between the lens 51 and the holder main frame 43 such that the retainer 80 sandwiches a flat plane 47c of the holder main frame 43 and an upper surface 51c of the lens 51 at the supported side. The distance between the projection 80e and the lower pressing member 80c of the pressing member 80 is less than the distance between the flat plane 47c and the upper surface 51c of the lens 51 at the supported side. The projection 80e contacts the upper surface 51c, and the lower pressing member 80c contacts the flat plane 47c. With this configuration, the lens 51 contacts reliably the upper surface 47a by the biasing force (resilience of the spring) of the retainer 80.

An upper surface 51d of the lens 51 at the pressed side is provided with the above-described glass plate 51b which is pressed downward by the second spring 49 serving as the second pressing member. As long as the second spring 49 can apply stress, the second spring 49 may be a compression coil spring. In terms of limited space and the cost, it is desirable to use a leaf spring as the second spring 49 as in the illustrative embodiment.

As described above, the tip of the projection 80e has a spherical surface so that a contact condition of the projection 80e contacting the upper surface 51c of the lens 51 is point contact. In this configuration, stress caused by the retainer 80 is concentrated at one point so that pressure is reliably applied to the lens 51.

According to the illustrative embodiment, the projection 80e is formed as a single integrated unit with the spring plate through stamping process. Alternatively, the projection 80e may be formed independent of the spring plate. For example, the projection 80e may be made of resin. In a case in which the projection 80e is formed independent of the upper pressing member 80a, a desired friction coefficient can be obtained at the pressing portion depending on the material and the surface finish of the projection 80e.

The projection 80e is formed at a position corresponding to substantially the center of the lens 51 in the optical axis direction. In this configuration, it is difficult to generate moment of the stress caused by the retainer 80, thereby preventing displacement of the lens 51 due to the moment.

Next, a description is provided of prevention of slippage of the retainer 80.

As described above with reference to FIG. 2, the retainer 80 is inserted in the optical axis direction indicated by the arrow. The projection 80d projects downward from the lower pressing member 80c by approximately 0.8 to 1.2 mm.

The rotary shaft 48 includes a groove 48a that engages the projection 80d of the retainer 80 when the retainer 80 is inserted, thereby reliably fixing the retainer 80 to the rotary shaft 48. The diameter of the groove 48a is approximately 1 mm smaller than the diameter of the rotary shaft 48.

When engaged with the groove 48a, the projection 80d is prevented from moving in the direction opposite the direction of insertion indicated by the arrow. In other words, the groove 48a and the projection 80d constitute a stopping mechanism. With this configuration, the retainer 80 is prevented from falling off from the lens holder 40 even when the lens holder 40 is subjected to shock or vibration. As long as the retainer 80 stays reliably on the lens holder 40, the stopping mechanism is not limited to the groove 48. Furthermore, the stopping mechanism may be provided to a suitable place on the lens holder 40.

The retainer 80 of the illustrative embodiment is C-shaped so that it can be attached to the lens holder 40 and the lens by inserting the retainer 80, that is, by a single operation. With this configuration, the optical element (lens 51) is prevented easily from moving. Engaging the projection 80d of the retainer 80 with the groove 48a constituting the stopping mechanism can reliably hold the optical element in place, preventing displacement of the optical element.

Figure 12A:
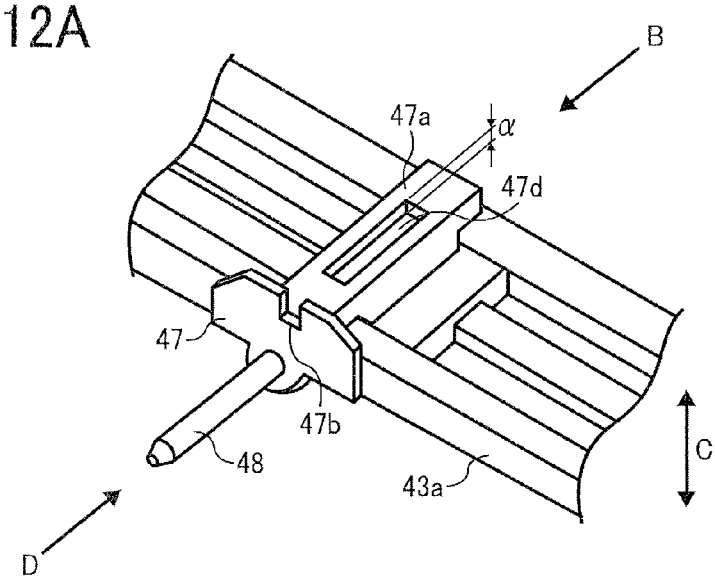
FIG. 12A is a perspective view schematically illustrating a hollow portion of an upper surface of a regulating member of the lens holder according to a second illustrative embodiment.
Figure 12B:
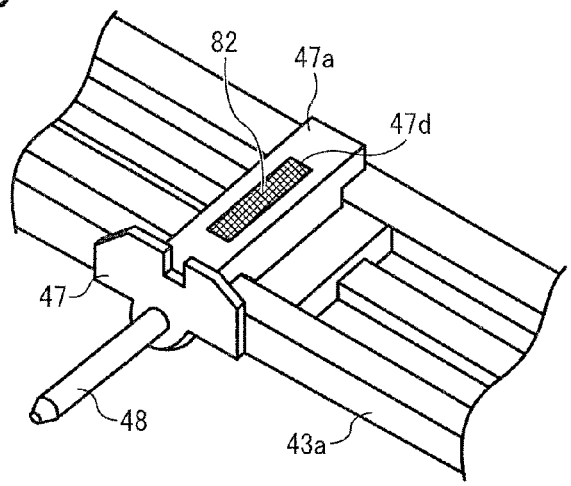
FIG. 12B is a perspective view schematically illustrating the hollow portion in which adhesive is applied.

With reference to FIGS. 12A and 12B, a description is provided of a second illustrative embodiment. FIG. 12A is a perspective view schematically illustrating a hollow portion of the upper surface 47a of the regulating member 47 according to the second illustrative embodiment. FIG. 12B is a perspective view schematically illustrating the hollow portion provided with an adhesive agent. It is to be noted that the same components as those in the previous embodiment are given the same reference numerals and will not again be described, when discrimination therebetween is not required.

According to the foregoing embodiments, the optical element (lens 51) is held using the elastic force of the springs. According to the second illustrative embodiment, the lens 51 is fixed to the lens holder 40 using an adhesive agent filled in a hollow portion 47d.

As illustrated in FIG. 12A, the hollow portion 47d is rectangular and has a depth $\alpha$ in a range of from 0.1 mm to 0.3 mm. In the hollow portion 47d, an adhesive layer 82 serves as a lens retaining member is formed as illustrated in FIG. 12B. If the adhesive layer 82 is relatively thick, deformation of the adhesive layer due to temperature and humidity is significant. Hence, the depth α is determined by empirical facts and experiments.

According to the second illustrative embodiment, the hollow portion 47d is provided at one place. Alternatively, a plurality of hollow portions may be provided to enhance adhesiveness and prevent concentration of deformation of the adhesive layer at a particular place.

As an adhesive agent, it is desirable to use a UV curable resin. For example, such a UV curable resin includes, but is not limited to, TB3031 manufactured by ThreeBond Co., Ltd. and UVZ108C manufactured by Sumitomo 3M Limited. Because the lens 51 is made of substantially transparent material, the UV curable resin can be cured easily by illuminating ultraviolet (UV) rays. More specifically, after a certain amount of UV curable resin is applied to the hollow portion 47a, the resin is illuminated with the UV rays while the bottom surface of the lens 51 is pressed against the upper surface 47a of the regulating member 40 in the sub-scanning direction by using a jig, curing the resin. After the resin is cured and fixed, the jig is removed, thereby fixing reliably the lens 51 and the holder main frame 43 together.

Figure 13:
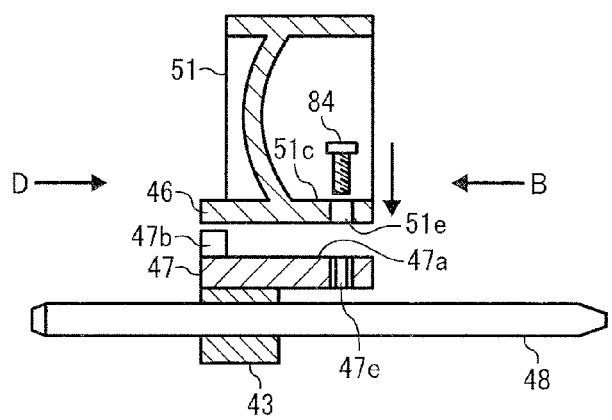
FIG. 13 is a cross-sectional view schematically illustrating the lens, the holder, and a screw serving as the retainer before the lens is positioned in place according to a third illustrative embodiment.

With reference to FIG. 13, a description is provided of a third illustrative embodiment. FIG. 13 is a cross-sectional view schematically illustrating the lens 51, the holder main frame 43, and a screw 84 serving as the retainer before the lens 51 is positioned in place according to a third illustrative embodiment.

According to the third illustrative embodiment, the upper surface 47a of the regulating member 47 includes a screw hole 47e through which the screw 84 serving as the retainer to hold the lens 51 is inserted. The lens 51 is placed on the holder main frame 43 and positioned in place. Subsequently, the screw 84 is fastened so that substantially the center of the lens 51 and the upper surface 47a of the regulating member 47 are tightly fixed.

For the screw 84, a fine pitch thread with a thread pitch of 0.5 mm or less may be employed. When fastening, a torque may be controlled so that variation in tightness can be reduced.

Figure 14A:
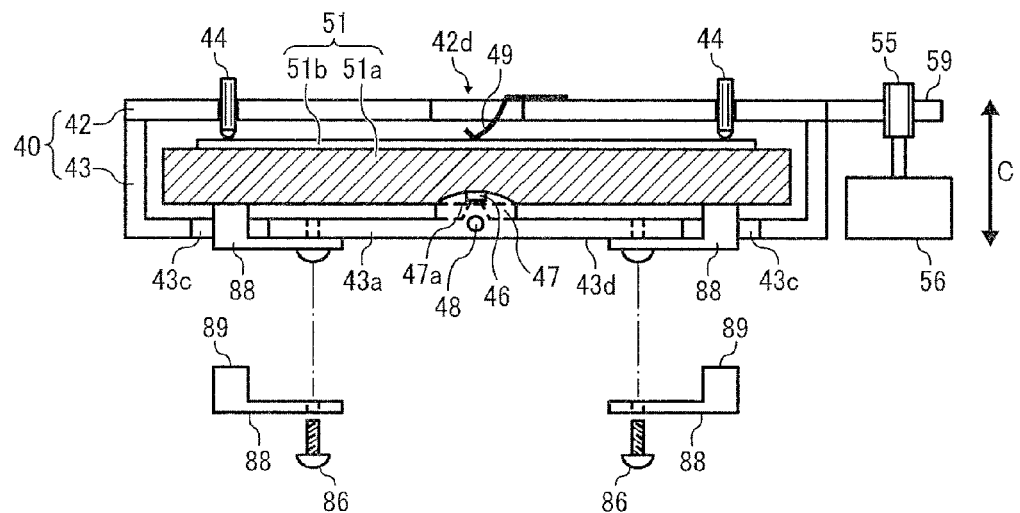
FIG. 14A is a cross-sectional view illustrating the holder including a temporary support according to a fourth illustrative embodiment.
Figure 14B:
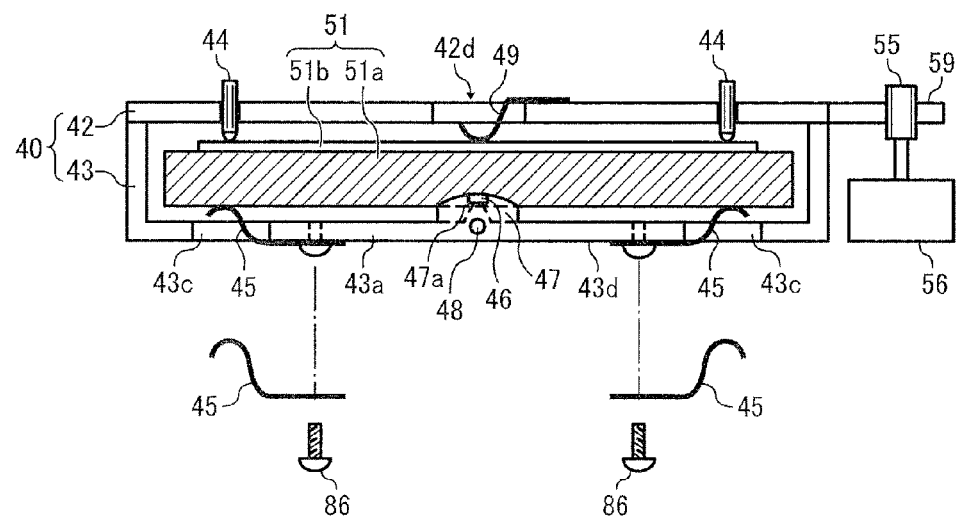
FIG. 14B is a cross-sectional view illustrating the holder after the lens and the holder are positioned in place and the temporary support is removed according to the fourth illustrative embodiment.

With reference to FIGS. 14A and 14B, a description is provided of a fourth illustrative embodiment. FIG. 14A is a cross-sectional view illustrating the lens holder 40 including a temporary support 88. FIG. 14B is a cross-sectional view illustrating the lens holder 40 after the lens 51 and the lens holder 40 are positioned in place and the temporary support 88 is removed. According to the fourth illustrative embodiment, the position of the lens 51 is temporarily fixed in place using the temporary support 88 before the lens 51 is permanently fixed by the retainer, thereby enhancing positioning accuracy after the lens 51 is permanently fixed.

A through hole 43c is formed in the bottom portion 43a of the holder main frame 43. The pressing portion of the first spring 45 is inserted through the through hole 43c from the bottom of the bottom portion 43a outside the holder main frame 43 to support the lens 51, similar to the second spring 49. After the lens 51 is fixed to the lens holder 40 by the retainer of foregoing embodiments, as illustrated in FIG. 14B, the first spring 45, which is detachable, is fastened to a bottom surface 43d of the bottom portion 43a by a fastening member 86 such as a small screw and a bush. Before the lens 51 is fixed to the lens holder 40 with the retainer, the first spring 45 is not attached. Instead, as illustrated in FIG. 14A, the temporary support 88 is attached temporarily to the bottom surface 43d of the lens holder 40.

As illustrated in FIG. 14A, the temporary support 88 includes a reference surface 89. The temporary support 88 is attached temporarily to the holder main frame 43 such that the reference surface 89 of the temporary support 88 is at the same level as the upper surface 47a of the regulation member 47 in the sub-scanning direction, and the distance between the bottom surface of the lens 51 and the bottom portion 43a of the holder main frame 43 is the same across the scanning direction. In other words, the lens 51 is supported at three places and positioned in place in the sub-scanning direction. Subsequently, the lens 51 is fixed to the lens holder 40 using the above-described retaining methods, for example, the retainer, the adhesive agent, and so forth.

After the lens 51 is fixed to the lens holder 40, the temporary support 88 is removed, and then the first spring 45 is attached. With this configuration, the lens 51 can be positioned in place from the beginning of assembly.

An advantage of use of the adhesive agent is that it is relatively easy to fix the lens 51. More particularly, the adhesive agent using the UV curable resin can fix the lens 51 tightly to the lens holder 40 and can be cured by the UV rays in a relatively short period of time. Such an adhesive agent prevents displacement of the optical element.

According to the fourth illustrative embodiment, when fixing the optical element to the holder using the temporary support, the distance between the holder and the optical element does not change in the main scanning direction and the optical element can be fixed tightly to the holder, preventing displacement of the optical element. According to the illustrative embodiment, the present disclosure is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanner, comprising:
   a light source to project light;
   a light deflector disposed on an optical path of the light projected from the light source to deflect and scan the light;
   an optical element to focus the light deflected by the light deflector onto a scanning surface; and
   a holder to hold the optical element,
   the holder comprising:
   a curve adjustment mechanism to adjust a shape of the optical element in a sub-scanning direction relative to the scanning surface and perpendicular to a main scanning direction;
   a first pressing member disposed at a first side from which the first pressing member presses the optical element in the sub-scanning direction;
   a second pressing member disposed at a second side opposite the first side, to press the optical element from the second side; and a retainer to fix substantially a center of the optical element in a main scanning direction of the light striking the optical element at the first side, the retainer including a first surface and a second surface, the first surface facing the optical element and the second surface facing the holder such that the first and second surface face each other and the optical element and the holder are interposed between the first surface and the second surface, the first surface having a width in the scanning direction that is shorter than a width in the scanning direction of the second surface and a portion of the second surface that faces the first surface having a notch therein, wherein the retainer includes a projection disposed substantially at the center of the first surface in the scanning direction, the projection configured to press against the optical element.

2. The optical scanner according to claim 1, wherein the retainer is C-shaped to hold a portion of the holder and substantially the center of the optical element using elasticity by pressingly inserting the retainer, an open side of the C-shaped retainer open toward a mounting direction of the retainer.

3. The optical scanner according to claim 2, wherein the retainer contacts the optical element with the projection.

4. The optical scanner according to claim 3, wherein the projection has a spherical surface.

5. The optical scanner according to claim 2, further comprising:
a stopping mechanism to prevent the retainer from falling off from the holder.

6. The optical scanner according to claim 1, wherein the curve adjustment mechanism is disposed at a plurality of places except substantially the center of the optical element.

7. The optical scanner according to claim 1, wherein the position of the first pressing member and the position of the curve adjustment mechanism are substantially the same in the main scanning direction.

8. The optical scanner according to claim 1, further comprising:
a temporary support detachably attachable relative to the holder, wherein
the first pressing member is detachable from the holder, and when the first pressing member is not attached to the holder, the temporary support supports the optical element such that the distance between the position of an optical axis of the optical element in the sub-scanning direction and the holder is the same across the scanning direction.

9. The optical scanner according to claim 1, wherein the optical element is a long-length lens, and a longitudinal direction thereof coincides with the main scanning direction.

10. An image forming apparatus, comprising:
an image bearing member to bear a latent image on a surface thereof;
the optical scanner of claim 1, to project light against the image bearing member to form the latent image on the surface thereof;
a developing device to develop the latent image formed on the image bearing member using toner to form a toner image;
a transfer device to transfer the toner image onto the recording medium; and
a fixing device to fix the toner image on the recording medium.

11. An optical scanner, comprising:
a light source to project light;
a light deflector disposed on an optical path of the light projected from the light source to deflect and scan the light;
an optical element to focus the light deflected by the light deflector onto a scanning surface; and
a holder to hold the optical element, the holder including,
a curve adjustment mechanism to adjust a shape of the optical element in a sub-scanning direction relative to the scanning surface and perpendicular to a main scanning direction,
a first pressing member disposed at a first side from which the first pressing member presses the optical element in the sub-scanning direction,
a second pressing member disposed at a second side opposite the first side, to press the optical element from the second side, and
a retainer to fix substantially a center of the optical element in a main scanning direction of the light striking the optical element at the first side, the retainer being C-shaped and configured to hold (i) a portion of the holder and (ii) substantially the center of the optical element using elasticity by pressingly inserting an open side of the C-shaped retainer toward the holder and the optical element, the retainer including a projection portion having a spherical surface, the spherical surface of the projection portion configured to contact the optical element.

* * * * *